United States Patent

[11] 3,615,575

| [72] | Inventor | Herbert Rauhut |
| | | Wiesbaden-Biebrick, Germany |
| [21] | Appl. No. | 748,650 |
| [22] | Filed | July 30, 1968 |
| [45] | Patented | Oct. 26, 1971 |
| [73] | Assignee | Keuffel & Esser Company |
| | | Hoboken, N.J. |
| [32] | Priority | July 31, 1967 |
| [33] | | Germany |
| [31] | | P 15 97 619.9 |

[54] TWO-COMPONENT BLACK-LINE DIAZO-TYPE MATERIAL
9 Claims, No Drawings

| [52] | U.S. Cl. | 96/91, 96/49 |
| [51] | Int. Cl. | G03c 1/58 |
| [50] | Field of Search | 96/49, 75, 91 |

[56] References Cited

UNITED STATES PATENTS

| 1,989,065 | 1/1935 | Schmidt et al. | 96/91 X |
| 2,531,004 | 11/1950 | Slifkin | 96/91 X |
| 2,537,001 | 1/1951 | Von Glahn et al. | 96/91 |
| 2,537,106 | 1/1951 | Von Glahn et al. | 96/91 |
| 3,248,220 | 4/1966 | Van Rhijn | 96/91 |

OTHER REFERENCES

Dinaburg, M., " Photosensitive Diazo Cpds," 1964, p. 106–109.

*Primary Examiner*—J. Travis Brown
*Assistant Examiner*—Charles L. Bowers, Jr.
*Attorneys*—J. Russell Juten, Peter F. Willig, Lionel N. White and Milford A. Juten ABSTRACT: Diazo-type material useful in the preparation of neutral black copies and having improved storage stability includes, with a p-phenylene-diamine light-sensitive diazonium compound, a blue-coupler and a yellow-coupler which is a bis-cyanoacetic-amide.

TWO-COMPONENT BLACK-LINE DIAZO-TYPE MATERIAL

BACKGROUND OF THE INVENTION

So-called blue couplers and yellow couplers are suitably combined in the diazo-type field for the production of copying materials producing black lines, from which generally also further copies can be made.

As yellow couplers for the formulation of black-line materials there are known acetoacetic amides, for example, which yield dyestuffs with very good ultraviolet absorption and thus are also very suitable for intermediate original materials. But they have the disadvantage that two-component materials produced therewith have a relatively low storability, which, according to the presently existing theory, results from the very high coupling speed.

In U.S. Pat. No. 2,537,001 there are suggested cyanoacetamides as yellow couplers for formulations of black-line materials, which have a somewhat lower coupling speed and thus a somewhat better storability in two-component layers. The coupling speed of some of these compounds is very similar to that of the most usual blue components, e.g. of the 2-hydroxy-3-naphthoic amides, so that they may be combined with these blue couplers to give materials producing very good neutral black shades.

Some of these couplers, e.g. the cyanoacetamide, however, yield dyestuffs which are very sensitive to pH changes. Even upon storage of the copies under normal conditions, the color shade noticeably changes. A great many of the compounds described in the mentioned patent specification furthermore are too difficulty soluble when used in aqueous coating solutions. Others have the disadvantage that, upon considerably long storage, particularly at elevated temperatures, a displacement of the coupling color shade of the material produced therewith from black to blue occurs. This phenomenon presumably results from a "migration" of the yellow coupler from the photosensitive layer.

SUMMARY OF THE INVENTION

The present invention comprises a two-component diazo-type material which contains in the photosensitive layer a diazonium compound of the unilaterally diazotized p-phenylene diamine type, at least one coupling component forming a blue dyestuff and at least one bis-cyanoacetic amide of the general formula

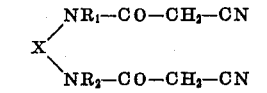

wherein
X stands for an alkylene group or hydroxyalkylene group with 2 to 8 carbon atoms which may be interrupted by an oxygen, sulfur or aminonitrogen atom or by a benzene nucleus, and
$R_1$ and $R_2$ stand for hydrogen or alkyl radicals with 1 to 4 carbon atoms, if desired linked to one another.

Nitrogen which may also be tertiary or quaternary is preferable as heteroatom in the alkylene chain.

In order to guarantee a satisfactory water solubility, the compounds with relatively short alkylene chains are preferable, e.g. with ethylene or propylene groups. Longer alkylene groups should preferably be interrupted by heteroatoms imparting water solubility or contain substituents imparting water solubility. Compounds with longer uninterrupted alkylene chains may also be used if coating is carried out from a solution in a mixture of water and organic solvent. For this application, there are also suitable compounds the alkylene chain of which is interrupted by a benzene ring but the benzene ring preferably should contain groups imparting water solubility, e.g. hydroxy or sulfonic acid groups.

The compounds in which R is a hydrogen atom are preferable at the present time, since their production is particularly simple. But compounds in which $R_1$ and/or $R_2$ are alkyl are also suitable for the application of the present invention, $R_1$ and $R_2$, if desired, being linked to one another to form an alkylene group.

The azodyestuffs obtained with the compounds used in accordance with the invention have a good covering power relative to ultraviolet light and are insensitive to changes of the pH value. The coupler compounds of the present invention approximate in coupling speed the usual blue couplers, e.g. the 2-hydroxy-3-naphthoic amides, so that black shades can be formulated therewith which, neither in the full nor in the intermediate shades, exhibit a displacement from the neutral black to grey. Even after a relatively long storage of the unexposed material, no displacement of the coupling color shade to blue occurs. It is furthermore noticeable that, despite their relatively high coupling speed, the diazo-type materials of the present invention have a very good storability. This is particularly surprising since it has been assumed that these two properties would interfere with one another.

The compounds in accordance with the invention have the further important advantage that they yield approximately the same color shade with highly photosensitive diazocompounds, i.e. such as contained in the benzene ring alkoxy groups in 2-position and 5-position, as with normally photosensitive ones which do not contain such substituents. This behavior is surprising insofar as most of the common coupling components yield distinctly different color shades with these different types of diazocompounds, those being generally less desirable which are obtained with the more preferable highly photosensitive type. The resorcinol often used as yellow coupling component thus yields with the indicated highly photosensitive compounds strongly red-tinged color which is not suitable for producing black color shades.

The simplest representative of the yellow couplers used in accordance with the present invention, i.e. wherein X is an ethylene group, is known. Other compounds are prepared in analogy with this compound from the corresponding diamine and cyanoacetic methyl ester or cyanoacetic ethyl ester.

PREFERRED EMBODIMENTS

The following examples illustrate the production of the diazo-type material of the present invention. They may, of course, be considerably modified without exceeding the scope of the invention.

Example 1

Photoprinting base paper provided with a precoat of colloidal silica and polyvinyl acetate was coated on the pretreated side with a solution containing in 100 ml. of water
 4.0 g. of tartaric acid,
 3.0 g. of thiourea,
 1.0 ml. of glacial acetic acid,
 1.0 g. of 2-hydroxy-3-naphthoic acid-($\beta$-aminoethyl)-amide, hydrochloride,
 1.0 g. of 1,2-bis-(cyanoacetylamino)ethane,
 2.0 g. of 1-diazo-4-morpholino-2,5-diethoxy-benzene, zinc chloride double salt.

After drying, the material was imagewise exposed to light and developed with ammonia. Black images with grey continuous tones on a white background were obtained.

Equally good results are obtained when using, instead of 1,2-bis-(cyanoacetylamino)ethane,
 1,4-bis(cyanoacetylamino)butane (Melting point: 156° to 157°C.),
 1,6-bis-(cyanoacetylamino)hexane (melting point: 150° C.),
 1,2-bis-(cyanoacetylamino)propane (melting point: 157° C.).

Example 2

A 150-μ thick cellulose acetate film was sensitized with the following solution:

30 ml. of water,
3 g. of sulphosalicylic acid,
2.7 g. of thiourea,
1.9 g. of 2-hydroxy-3-naphthoic acid-diethanolamide,
2.0 g. of bis-(cyanoacetylaminoethyl)amine, hydrochloride,
2.5 ml. of formic acid,
45 ml. of isopropanol,
5 g. of 1-diazo-4-morpholino-2,5-diethoxy-benzene as tetrafluoroborate.

After drying, the sensitized material was imagewise exposed to light under an original and developed with ammonia. Black images with a very good covering power were obtained on a well transparent background.

Equally good results were obtained when using as the support a film of polyethylene terephthalate, which was provided on one side with a suitably anchored lacquer coating of cellulose ester, e.g. cellulose acetate propionate.

The bis-(cyanoacetylamino-ethyl)amine used in this example was prepared as follows:

99 g. of cyanoacetic methyl ester were dissolved in 250 ml. of methanol. 52 g. of bis-(β-aminoethyl)amine were dropwise added with stirring at temperatures up to 40° C. and the mixture was then stirred for 1 hour at 40° C. Fifty ml. of concentrated hydrochloric acid were added to the warm solution. After cooling, 99 g. of bis-(cyanoacetylaminoethyl)amine crystallized as hydrochloride. The melting point was 192° C.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Diazo-type composition comprising:
   a. a light-sensitive unilaterally diazotized p-phenylene diamine diazonium compound;
   b. a coupler compound capable of forming a blue azodye with said diazonium compound; and
   c. a coupler compound capable of forming a yellow azodye with said diazonium compound and having the general formula:

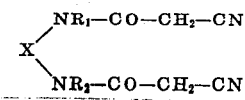

wherein
   X stands for an alkylene with 2 to 8 carbon atoms or a dialkylamino group with 2 to 8 carbon atoms wherein each alkyl group is directly attached to each amido moiety of the recited formula, and
   $R_1$ and $R_2$ stand for hydrogen or alkyl radicals with 1 to 4 carbon atoms.

2. Diazo-type composition according to claim 1 wherein:
   X stands for an alkylene or a dialkylamino group with 2 to 6 carbon atoms; and
   $R_1$ and $R_2$ are hydrogen.

3. Diazo-type composition according to claim 2 wherein said yellow azocoupler is 1,2-bis-(cyanoacetylamino)ethane.

4. Diazo-type composition according to claim 2 wherein said yellow azocoupler is 1,4-bis-(cyanoacetylamino)butane.

5. Diazo-type composition according to claim 2 wherein said yellow azocoupler is 1,6-bis-(cyanoacetylamino)hexane.

6. Diazo-type composition according to claim 2 wherein said yellow azocoupler is 1,2-bis-(cyanoacetylamino)propane.

7. Diazo-type composition according to claim 2 wherein said yellow azocoupler is bis-(cyanoacetylaminoethyl)amine.

8. Diazo-type composition according to claim 2 wherein said diazonium compound is a 1-diazo-4-morpholino-2,5,-dialkoxybenzene salt.

9. Diazo-type composition according to claim 2 wherein said blue azocoupler is a 2-hydroxy-3-naphthoic acid amide.

* * * * *